United States Patent [19]

Morii

[11] Patent Number: 5,237,495

[45] Date of Patent: Aug. 17, 1993

[54] PRODUCTION/PURCHASE MANAGEMENT PROCESSING SYSTEM AND METHOD

[75] Inventor: Hideki Morii, Machida, Japan

[73] Assignee: Fujitsu Limited, Tokyo, Japan

[21] Appl. No.: 704,450

[22] Filed: May 23, 1991

[30] Foreign Application Priority Data

May 23, 1990 [JP] Japan .................................. 2-133127

[51] Int. Cl.⁵ ...................... G06F 15/22; G06F 15/00
[52] U.S. Cl. .................................... 364/401; 364/403
[58] Field of Search ............... 364/401, 403, 405, 408, 364/468

[56] References Cited

U.S. PATENT DOCUMENTS 5,101,352 8/1992 Rembert .............................. 364/401

FOREIGN PATENT DOCUMENTS 251051 10/1987 Japan .
93549 4/1988 Japan .
4866 1/1989 Japan .
1-66202 6/1989 Japan .
244572 9/1989 Japan .
296374 11/1989 Japan .

Primary Examiner—Roy N. Envall, Jr.
Assistant Examiner—Khai Tran

[57] ABSTRACT

A production/purchase management processing system is provided which includes a master production schedule which describes a production planning of each of a plurality of kinds of products independently for each period. A product construction/item master is provided in the system for describing information related to parts which form the product for each of the products. A stock/remaining order information source of the system describes stock quantity and remaining orders for the items which represent the product or the part. A production planning processor reads the contents of the master production schedule, the product construction/item master and the stock/remaining order information source and outputs a purchase planning order and a production planning order which are generated based on the read contents. The system further includes a reorganization processor which outputs a reorganization production planning order for at least one item which is included in the production planning order based on processes carried out in the production planning processor and the reorganization processor.

12 Claims, 6 Drawing Sheets

|   | 1ST WEEK | 2ND WEEK | 3RD WEEK |     |
|---|---|---|---|---|
| A | 30 | 40 | 50 | MASTER PRODUCTION SCHEDULE |
| X | 10 | 5 | 15 | |
| ⋮ | ⋮ | ⋮ | ⋮ | |
| B | 120 | 200 | 300 | |
| C | 60 | 80 | 100 | |

FIG. IC PRIOR ART

|       | 1ST WEEK | 2ND WEEK | 3RD WEEK |
|-------|----------|----------|----------|
| B (A) | 60       | 100      | 150      |
| B (X) | 20       | 10       | 45       |
| B (Y) | 40       | 90       | 105      |

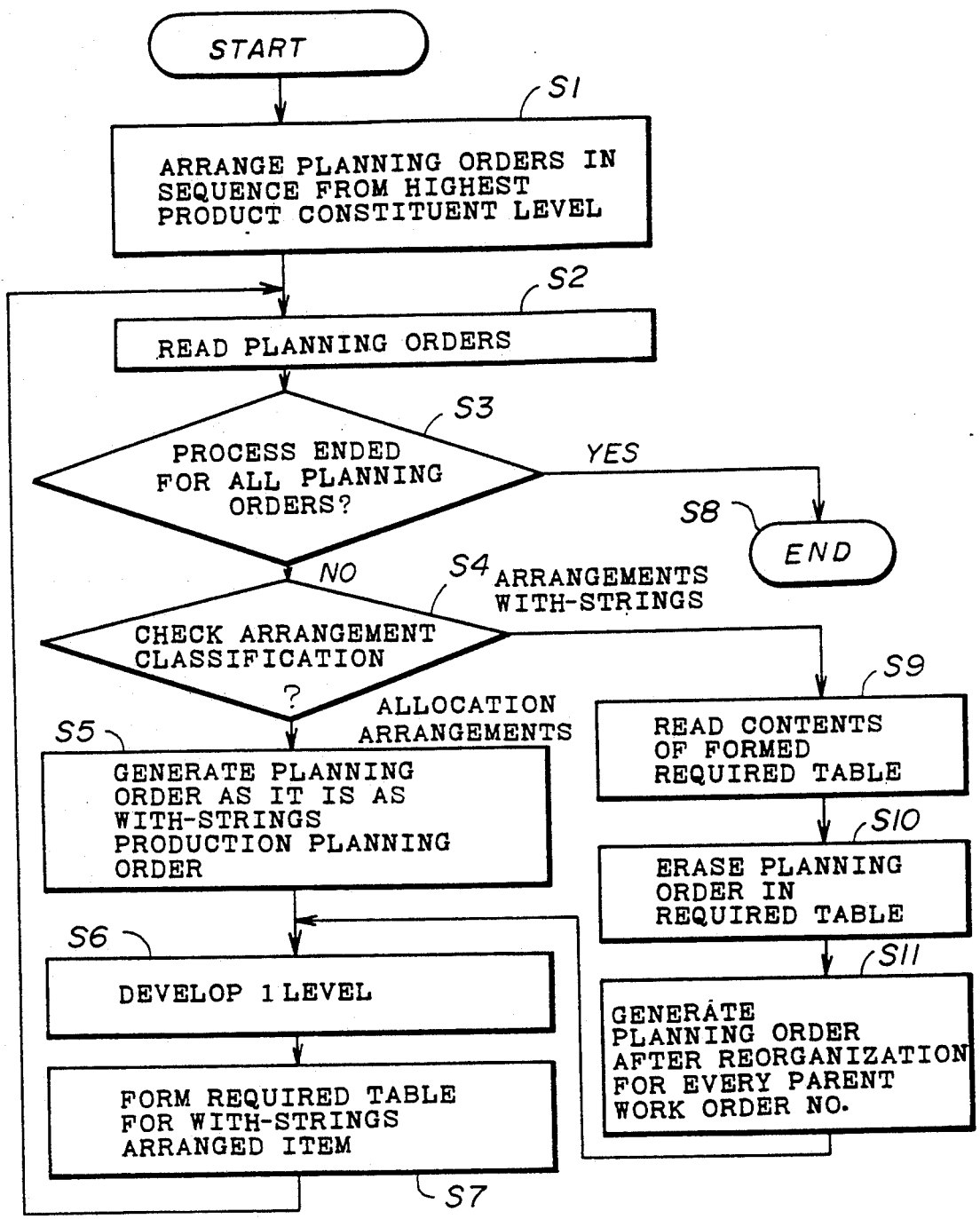

FIG.5A

⟨PLANNING ORDER⟩

| ITEM NO. | ORDER NO. | STARTING TIME | DELIVERY TIME | PRODUCTION NO. |
|---|---|---|---|---|

⟨INFORMATION FROM ITEM MASTER⟩ 10

| LOW LEVEL CODE | ARRANGEMENT CLASSIFICATION |
|---|---|

FIG.5B

⟨REQUIRED TABLE⟩ 20

| ITEM NO. | PARENT WORK ORDER NO. | TOP LEVEL WORK ORDER NO. | REQUIRED TIME | REQUIRED NO. |
|---|---|---|---|---|

FIG.5C

⟨PLANNING ORDER AFTER REORGANIZATION⟩ 30

| ITEM NO. | ORDER NO. | PARENT WORK ORDER NO. | TOP LEVEL WORK ORDER NO. | STARTING TIME | DELIVERY TIME | PRODUCTION NO. | ALLOCATED STOCK |
|---|---|---|---|---|---|---|---|

PRODUCTION/PURCHASE MANAGEMENT PROCESSING SYSTEM AND METHOD

BACKGROUND OF THE INVENTION

The present invention generally relates to production/purchase management processing systems and methods, and more particularly to production/purchase management processing system and method which integrate the so-called material requirement planning (MRP) system and the project order system.

The project order system is a system which makes the arrangements for parts and intermediate products forming the final products for each final product which is to be delivered to the customer. The product number is assigned to each final product, and the purchase, assembling plan for the daily routine, the progress management, the cost accounting and the like are made in units of product numbers. Hence, even when there are parts and intermediate products which are common to the different final products, the planning and management thereof are made independently.

When managing production of products, different management systems are required depending on the characteristics of the products. In other words, some products are planned and mass produced, while other products are produced in small numbers on receipt of an order.

The MRP system is known as a system for managing planned mass production of products. According to the MRP system, the needs are consolidated depending on the item and period for each required item of a plurality of products. Hence, when there is a production order for an item, it is unclear to which product the item of the production order belongs. In addition, the MRP system is unsuited for managing the progress of the production and the cost for each final product (ordered item). For these reasons, the MRP system is unsuited for application to products which are produced in small numbers on receipt of an order.

On the other hand, the project order system is suited for application to products which are produced on receipt of an order because the parts of the final product as well as the final product are assigned the same number with strings. "With strings" means that the purchase orders of the parts, the assembling orders for the intermediate products and the assembling orders for the final products are correlated in units of the final product according to the project order system. However, it is difficult to cope with surplus parts and short delivery time limit.

FIGS. 1A, 1B and 1C are diagrams for explaining the concept of the MRP system.

FIG. 1A shows that a final product A is formed from parts B and P, and the part B is formed from parts C, . . . . In addition, a final product X is formed from parts B, . . . . Furthermore, a final product Y is formed from parts Q, . . . , and the part Q is formed from parts B, . . . .

In this case, the part B is required in a second level of the product A, the second level of the product X and the third level of the product Y. When obtaining the products A, X and Y with delivery time limits which are approximately the same, a schedule is made as shown in FIG. 1B for the part B when the MRP system is employed and the production order is made so that the schedule can be kept. In FIG. 1B, the number of the products A required is 30 for the first week, 40 for the second week and 50 for the third week. The number of the products X required is 10 for the first week, 50 for the second week and 15 for the third week. The schedule for the product Y and the parts P and Q is omitted for the sake of convenience. According to the schedules shown in FIG. 1B, the number of the parts B required is 120 for the first week, 200 for the second week and 300 for the third week.

FIG. 1C shows a schedule B(A) for the parts B required by the product A, a schedule B(X) for the parts B required by the product X and a schedule B(Y) for the parts B required by the product Y, for the first, second and third weeks. The schedules for the products A, X, . . . shown in FIG. 1B are called a master production schedule, and the master production schedule is formed based on the hierarchical structure of the products A, X and Y and the schedules shown in FIG. 1C. However, in the master production schedule, there is no information related to how many of the parts B, for example, are required by the products A, X and Y. In other words, there is no corresponding information to link each part and each product.

A modification of the MRP system has been proposed to indicate to which product each part belongs with strings. However, if the correspondence of each part and the product is indicated, an extremely long processing time is required to indicate the correspondence of the part and product and an extremely large filing space is required to store information related to the correspondence.

FIG. 2 is a diagram for explaining the processing of the MRP system. FIG. 2 shows a production planning processor 1 which carries out a production planning process for each item, a master production schedule 2 which is made up of the schedules for the products A, X and Y, a product construction/item master 3 for storing information related to items which are required when obtaining each product, stock/remaining order information 4 for supplying information related to the present stock (or stock quantity) and the remaining orders for each item, a purchase planning order 5 for satisfying a required number of an arbitrary item by purchase, and a production planning order 6 for satisfying a required number of an arbitrary item by production.

The item refers to the product or the part which forms the product.

In the case shown in FIGS. 1A through 1C, the production planning order 6 for the part B is output as 120 for the first week, 200 for the second week and 300 for the third week.

But as described above, the information shown in FIG. 1C does not exist in the production planning order 6 when the MRP system is employed. For this reason, there is a problem in that the MRP system is unsuited for producing the products on receipt of an order.

SUMMARY OF THE INVENTION

Accordingly, it is a general object of the present invention to provide a novel and useful production/purchase management processing system in which the problem described above is eliminated.

The above and other objects of the present invention are attained by a production/purchase management processing system, comprising a master production schedule which describes a production planning of each of a plurality of kinds of products independently for each period, a product construction/item master which describes information related to parts which form the product for each of the products, a stock/remaining order information source which describes stock quantity and remaining orders for items, where the items respectively represent the product or the part, a production planning processor for reading the contents of the master production schedule, the product construction/item master and the stock/remaining order information source, and for outputting a purchase planning order and a production planning order which are generated based on the read contents, where the purchase planning order satisfies a required number of an arbitrary item by purchase and the production planning order satisfies a required number of an arbitrary item by production, and a with-strings reorganization processor for outputting a with-strings production planning order for each of the products having as its constituent element an item for which the production planning order is output from the production planning processor. The with-strings production planning order is output for at least one item which is included in the production planning order based on processes carried out in the production planning processor and the with-strings reorganization processor. According to the production/purchase management processing system of the present invention, it is possible to form an appropriate with-strings production planning order in a form in which the item requiring the with-strings classification is specified. In other words, it is possible to easily select the MRP system and the project order system. In addition, it is possible to enjoy the advantageous features of both the MRP system and the project order system.

The objects of the present invention are also attained by a production/purchase management processing method comprising the steps of (a) reading the contents of a master production schedule, a product construction/item master and a stock/remaining order information source so as to generate a purchase planning order and a production planning order based on the read contents, the master production schedule describing a production planning of each of a plurality of kinds of products independently for each period, the product construction/item master describing information related to parts which form the product for each of the products, the stock/remaining order information source describing stock quantity and remaining orders for items, the items respectively representing the product or the part, the purchase planning order satisfying a required number of an arbitrary item by purchase, the production planning order satisfying a required number of an arbitrary item by production, and (b) generating a with-strings production planning order for each of the products having as its constituent element an item for which the production planning order is generated, where the with-strings production planning order is generated for at least one item which is included in the production planning order based on processes carried out in the steps (a) and (b).

Other objects and further features of the present invention will be apparent from the following detailed description when read in conjunction with the accompanying drawings.

BRIEF DESCRIPTION OF THE DRAWINGS

FIG. 4 is a flow chart for explaining an embodiment of the production/purchase management processing system according to the present invention;

FIG. 5A shows a format of a planning order shown in FIG. 4;

FIG. 5B shows a format of a required table shown in FIG. 4;

FIG. 5C shows a format of a with-strings production planning order after reorganization.

DESCRIPTION OF THE PREFERRED EMBODIMENTS

Figure 1:
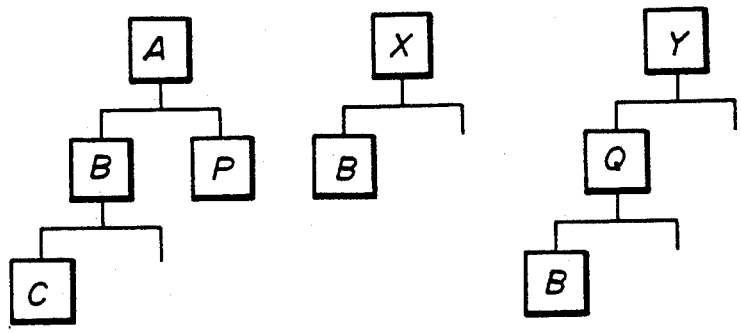
FIGS. 1A through 1C are diagrams for explaining the concept of the MRP system.

First, a description will be given of an operating principle of a production/purchase management processing system according to the present invention, by referring to FIG. 3. In FIG. 3, those parts which are the same as those corresponding parts in FIG. 2 are designated by the same reference numerals.

Figure 2:
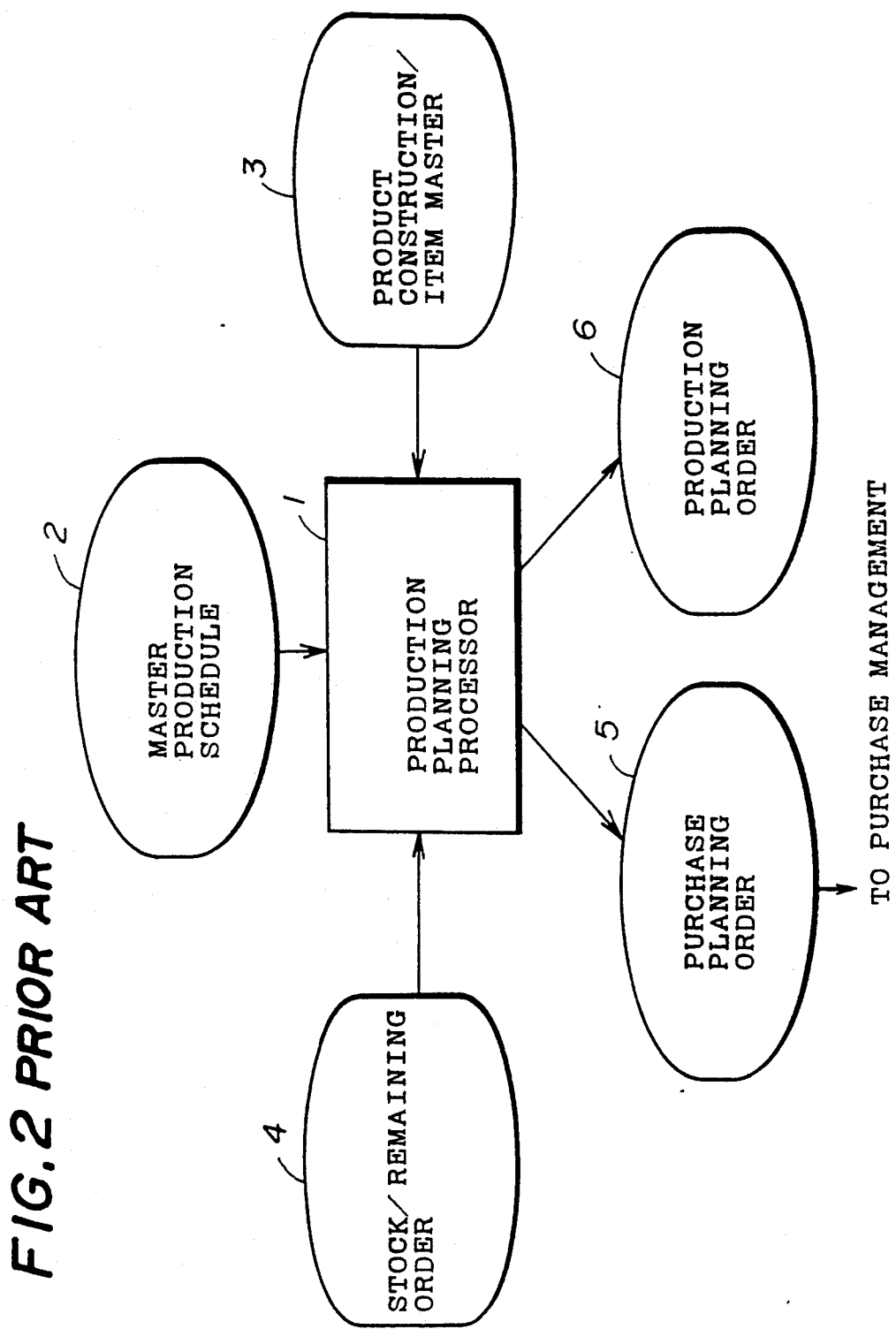
FIG. 2 is a diagram for explaining the processing of the MRP system.
Figure 3:
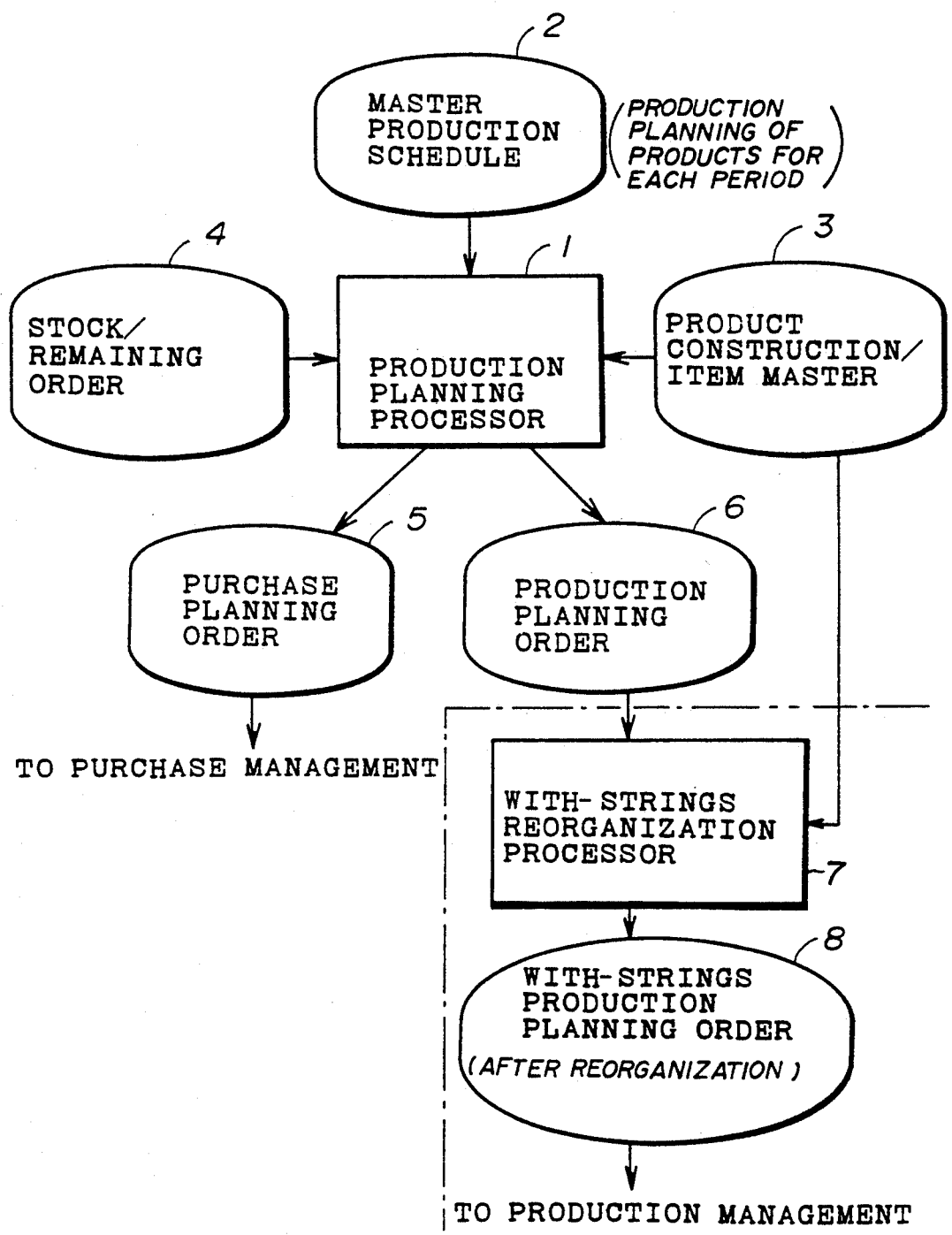
FIG. 3 is a diagram for explaining the operating principle of a production/purchase management processing system according to the present invention.

FIG. 2 shows a production planning processor 1 which carries out a production planning process for each item, a master production schedule 2 which is made up of the schedules for the products A, X and Y, a product construction/item master 3 for storing information related to items which are required when obtaining each product, stock/remaining order information 4 for supplying information related to the present stock quantity and the remaining orders for each item, a purchase planning order 5 for satisfying a required number of an arbitrary item by purchase, and a production planning order 6 for satisfying a required number of an arbitrary item by production. The above elements 1 through 6 are the same as those shown in FIG. 2. However, in the present invention, the following additional elements 7 and 8 are provided which are the with-strings reorganization processor 7 and the with-strings production planning order 8.

Based on the contents of the master production schedule 2 and the product construction/item master 3, it is possible to know which items are required and how many are required. Hence, the purchase planning order 5 and/or the production planning order 6 is/are output from the production planning processor 1 for each item by considering the stock/remaining order information 4 for each item.

With regard to an item for which the production planning is to be considered under the with-strings state so as to correspond to the project order system, the contents of the production planning order 6 for this item is supplied to the with-strings reorganization processor 7 to output the with-strings production planning order 8.

The item refers to the product or the part which forms the product.

For the case shown in FIGS. 1A through 1C, for example, the with-strings production planning order 8 which corresponds to the schedules shown in FIG. 1C is obtained for the production planning order 6 which corresponds to the schedule for the part B shown in FIG. 1B by considering the contents of the product construction/item master 3.

Next, a description will be given of an embodiment of the production/purchase management processing system according to the present invention, by referring to FIG. 4. FIG. 4 shows the process of the with-strings reorganization processor 7 in this embodiment.

The master production schedule 2 is obtained in the form of the schedule shown in FIG. 1B. In addition, the information related to the constituent items shown in FIG. 1A is obtained from the product construction-/item master 3. For the sake of convenience, the stock-/remaining order information 4 will be neglected in the following description.

When obtaining the with-strings production planning order 8 for the part B, it is possible to know the following from the information shown in FIG. 1A. That is, (i) the part B is an item in the second level of the product A, (ii) the part B is an item in the second level of the product X, (iii) the part B is an item in the third level of the product Y, (iv) the lowest level in which the part B exists is the third level for all the products A, X and Y.

By taking the above into consideration, the production planning processor 1 shown in FIG. 3 forms planning orders for all related items, that is, the products A, X and Y and the parts B, P, Q and C.

FIG. 5A shows a format of a planning order shown in FIG. 4. FIG. 5B shows a format of a required table shown in FIG. 4. In addition, FIG. 5C shows a format of a with-strings production planning order after reorganization.

The planning order 10 shown in FIG. 5A includes an item number of the concerned item, an order number which is uniquely assigned in one-to-one correspondence with the item number, a starting time, a delivery time and a production number. The planning order 10 additionally includes a low level code which indicates a lowest level in which the item (part) exists, that is, the third level in the case of the part B described above, and an arrangement classification which instructs whether or not the with-strings production planning order 8 is to be output. The arrangement classification indicates whether arrangements for a certain intermediate product are to be made in a sequence dependent on the levels of work orders or dependent on the appointed date of delivery, independently of the levels of work orders. The additional information, namely, the low level code and the arrangement classification, is obtained from the product construction/item master 3. The strings are attached in the case of a with-strings arrangement, while no strings are attached in the case of an allocation arrangement.

The planning order 10 shown in FIG. 5A is prepared for each item as described above, and the process shown in FIG. 4 starts.

A step S1 shown in FIG. 4 arranges the planning orders 10 in sequence from the highest product constituent level. In other words, in the case shown in FIG. 1A, the planning orders 10 are arranged in sequence of the planning order for the product A, the planning order for the product X, the planning order for the product Y, the planning order for the part B(A), the planning order for the part P(A), the planning order for the part B(X), ..., the planning order for the part Q(Y), ..., the planning order for the part C(A), ..., and the planning order for the part B(Y). The planning orders 10 are processed in this sequence.

A step S2 successively reads the planning orders 10 in sequence. A step S3 checks whether or not the process is ended for all the planning orders 10. The process ends in a step S8 when the judgement result in the step S3 is YES. However, when the process is simply ended for the planning order for the product A, for example, the judgement result in the step S3 is NO and the process advances to a step S4.

The step S4 checks whether the arrangement classification in the additional information of the planning order 10 instructs the with-strings arrangement or the allocation arrangement. For example, the arrangement classification instructs the allocation arrangement in the case of the planning order for the product A. On the other hand, the arrangement classification instructs the with-strings arrangement in the case of the planning orders for the part B(A), the part B(X) and the part B(Y). The process advances to a step S5 when the allocation arrangement is detected in the step S4, while the process advances to a step S9 when the with-strings arrangement is detected in the step S4.

In a case where the planning order for the product A is being processed, the step S5 generates the planning order for the product A as it is as the with-strings production planning order 30 after the reorganization. Of course, a parent work order number, a top level work order number (final assembly work order number) and the allocated stock shown in FIG. 5C are added.

The parent work order number is an assembling order which uses the intermediate products or parts for which the arrangements are made by the purchase order or the assembling order. The top level work order number is the number of an order which assembles the final product, and from the point of view of forming the product, the top level work order number is the number of an order which assembles the top level product. The allocated stock is the quantity or number which is appropriated for the stock in order to satisfy the needs for a certain item, and is not newly produced.

After the step S5, a step S6 investigates the planning orders occupying subordinate positions relative to the planning order which is being processed, so as to determine whether or not there exists a subordinate planning order having the with-strings classification. In the case where the planning order for the product A is being processed, for example, the subordinate planning order for the part B(A) has the with-strings classification.

A step S7 forms a required table 20 shown in FIG. 5B for the part B(A) which has the with-strings classification. In the case of the part B(A), the required table 20 includes (i) B(A) as the item number, (ii) the order number for the product (item) A as the parent work order number, (iii) the order number for the product (item) A as the top level work order number, (iv) the first, second and third weeks as the required time, and (v) the number of required parts B(A) as the required number in correspondence with each required time.

After the step S7, the process returns to the step S2 to read the planning orders for the product X. In this case, the process advances from the step S3 through the step S7, and the process returns to the step S2 after the required table 20 for the part B(X) is formed.

Next, the planning orders for the product Y are read in the step S2. In this case, the process advances from the step S3 through the step S7 and the process thereafter returns to the step S2, but no required table 20 is formed yet for the part B(Y).

Then, the planning orders for the part B(A) is read, and the process advances to the step S9 via the steps S3 and S4. The step S9 reads the contents of the previously formed required table 20 for the part B(A). A step S10 subtracts the number written in the required table 20 for the part B(A) from the number in the previously formed production planning order 6 for the part B shown in FIG. 3. Thereafter, a step S11 forms a planning order 30 after reorganization shown in FIG. 5C for the part B(A). The process then advances to the step S6. In this case, the step S6 investigates the subordinate planning orders for the part C(A) occupying subordinate positions relative to the planning order for the part P(A) which is being processed, and it is detected that no subordinate planning order having the with-strings classification exists. Hence, the process returns to the step S2.

Thereafter, the planning orders for the part P(A) are processed, and the process returns to the step S2 via the steps S3 through S7. During this time, the subtraction is carried out in the step S10, and the step S11 forms the planning order 30 after reorganization for the part B(X) shown in FIG. 5C.

After the planning orders for the part B(Y) are processed similarly as described above, the judgement result in the step S3 becomes YES, and the process ends in the step S8.

Figure 6:
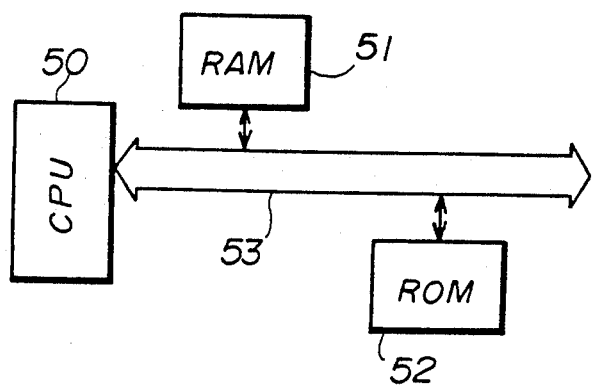
FIG. 6 is a system block diagram showing an embodiment of a system for carrying out the process shown in FIG. 4.

The process shown in FIG. 4 may be carried out on a system shown in FIG. 6. In FIG. 6, the system includes a central processing unit (CPU) 50, a random access memory (RAM) 51 and a read only memory (ROM) 52 which are coupled via a bus line 53. The CPU 50 reads programs prestored in the ROM 52 via the bus line 53, and stores the results of the operations into the RAM 51 via the bus line 53.

Therefore, according to the present invention, it is possible to form an appropriate with-strings production planning order in a form in which the item requiring the with-strings classification is specified. In other words, it is possible to easily select the MRP system and the project order system. In addition, it is possible to enjoy the advantageous features of both the MRP system and the project order system.

Further, the present invention is not limited to these embodiments, but various variations and modifications may be made without departing from the scope of the present invention.

What is claimed is:

1. A production/purchase management processing system comprising:
    a master production schedule which describes a production planning of each of a plurality of kinds of products independently for each period;
    a product construction/item master which describes information related to parts which form the product for each of the products;
    a stock/remaining order information source which describes stock quantity and remaining orders for items, said items respectively representing the product or the part;
    a production planning processor for reading the contents of said master production schedule, said product construction/item master and said stock/remaining order information source, and for outputting a purchase planning order and a production planning order which are generated based on the read contents, said purchase planning order satisfying a required number of an arbitrary item by purchase, said production planning order satisfying a required number of an arbitrary item by production; and
    a reorganization processor for outputting a reorganization production planning order for each of the products having as a constituent element thereof an item for which the production planning order is output from said production planning processor, wherein said reorganization production planning order is output for at least on item which is included in the production planning order based on processes carried out in said production planning processor and said reorganization processor.

2. The production/purchase management processing system as claimed in claim 1, wherein said reorganization processor generates a processing planning order which includes at least an item number of a concerned item, a delivery time, a production number and additional information received from said product construction/item master, said additional information including at least an arrangement classification which instructs whether or not the reorganization production planning order is to be output, said reorganization processor carrying out the process with respect to those items for which the arrangement classification is given and generating the reorganization production planning order based on the processing planning order.

3. The production/purchase management processing system as claimed in claim 2, wherein said processing planning order further includes an order number which is uniquely assigned in one-to-one correspondence with the item number and a starting time.

4. The production/purchase management processing system as claimed in claim 1, wherein said reorganization processor generates a processing planning order which includes at least an item number of a concerned item, a delivery time, a production number and additional information received from said product construction/item master, said additional information including at least a low level code which indicates a lowest level associated with a concerned item in a hierarchical structure of the product which is formed by parts in one or a plurality of levels of the hierarchical structure and an arrangement classification which instructs whether or not the reorganization production planning order is to be output, said reorganization processor carrying out the process with respect to those items for which the arrangement classification is given in a sequence starting from the item in a highest level of the hierarchical structure and generating the reorganization production planning order based on the processing planning order.

5. The production/purchase management processing system as claimed in claim 4, wherein said processing planning order further includes an order number which is uniquely assigned in one-to-one correspondence with the item number and a starting time.

6. The production/purchase management processing system as claimed in claim 1, wherein said reorganization processor generates a processing planning order which includes at least additional information received form said product construction/item master, said additional information including at least a low level code which indicates a lowest level associated with a concerned item in a hierarchical structure of the product which is formed by parts in one or a plurality of levels of the hierarchical structure, said reorganization processor carrying out the process with respect to those items in a sequence starting from the item in a highest level of the hierarchical structure and generating the reorganization production planning order based on the processing planning order.

7. A production/purchase management processing method comprising the steps of:

(a) reading the contents of a master production schedule, a product construction/item master and a stock/remaining order information source so as to generate a purchase planning order and a production planning order based on the read contents, said master production schedule describing a production planning of each of a plurality of kinds of products independently for each period, said product construction/item master describing information related to parts which form the product for each of the products, said stock/remaining order information source describing stock quantity and remaining orders for items, said items respectively representing the product or the part, said purchase planning order satisfying a required number of an arbitrary item by purchase, said production planning order satisfying a required number of an arbitrary item by production; and (b) generating a reorganization production planning order for each of the products having as a constituent element thereof an item for which the production planning order is generated, said reorganization production planning order being generated for at least one item which is included in the production planning order based on processes carried out in said steps (a) and (b).

8. The production/purchase management processing method as claimed in claim 7, wherein said step (b) generates a processing planning order which includes at least an item number of a concerned item, a delivery time, a production number and additional information read from said product construction/item master, said additional information including at least an arrangement classification which instructs whether or not the reorganization production planning order is to be generated, said step (b) carrying out the process with respect to those items for which the arrangement classification is given and generating the reorganization production planning order based on the processing planning order.

9. The production/purchase management processing method as claimed in claim 8, wherein said processing planning order further includes an order number which is uniquely assigned in one-to-one correspondence with the item number and a starting time.

10. The production/purchase management processing method as claimed in claim 7, wherein said step (b) generates a processing planning order which includes at least an item number of a concerned item, a delivery time, a production number and additional information read from said product construction/item master, said additional information including at least a low level code which indicates a lowest level associated with a concerned item in a hierarchical structure of the product which is form ed by parts in one or a plurality of levels of the hierarchical structure and an arrangement classification which instructs whether or not the reorganization production planning order is to be generated, said step (b) carrying out the process with respect to those items for which the arrangement classification is given in a sequence starting from the item in a highest level of the hierarchical structure and generating the reorganization production planning order based on the processing planning order.

11. The production/purchase management processing method as claimed in claim 10, wherein said processing planning order further includes an order number which is uniquely assigned in one-to-one correspondence with the item number and a starting time.

12. The production/purchase management processing method as claimed in claim 7, wherein said step (b) generates a planning order which includes at least additional information read from said product construction/item master, said additional information including at least a low lever code which indicates a lowest level associated with a concerned item in a hierarchical structure of the product which is formed by parts in one or a plurality of levels of the hierarchical structure, said step (b) carrying out the process with respect to the items in a sequence starting from the item in a highest level of the hierarchical structure and generating the reorganization production planning order based on the processing planning order.

* * * * *